M. G. STRUBLE.
HEADLAMP CONTROL.
APPLICATION FILED NOV. 17, 1915.
1,190,684. Patented July 11, 1916.
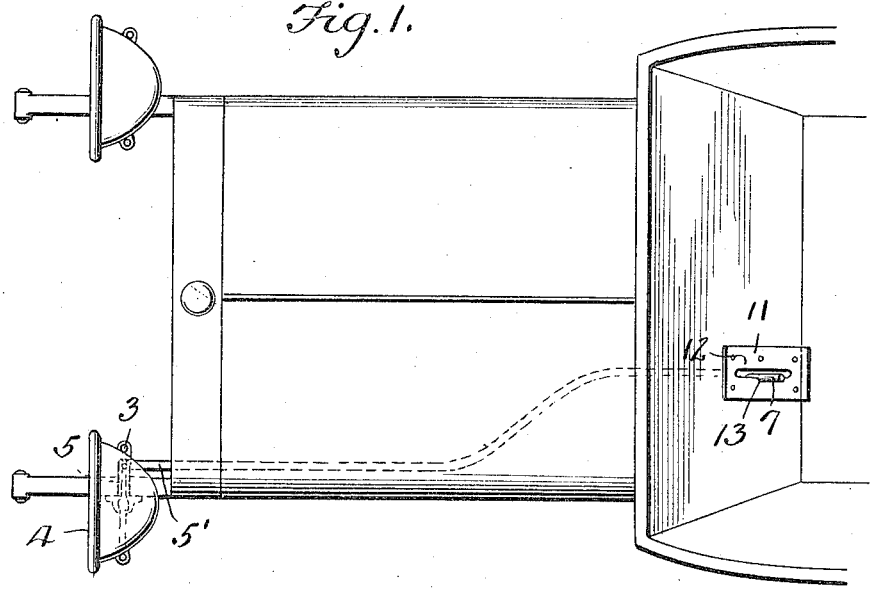
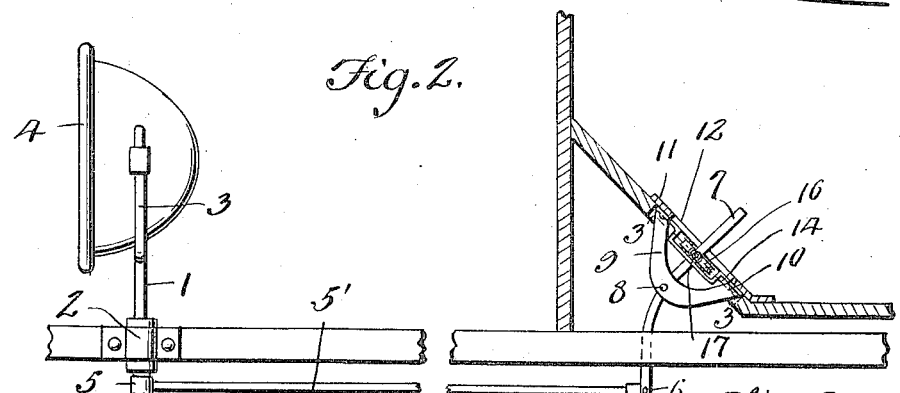
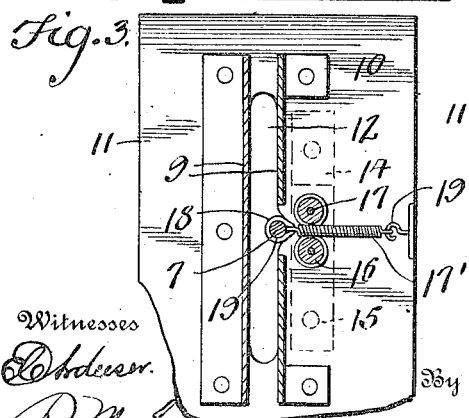
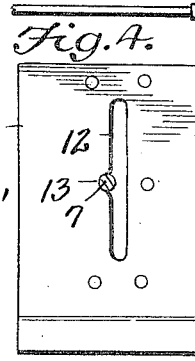
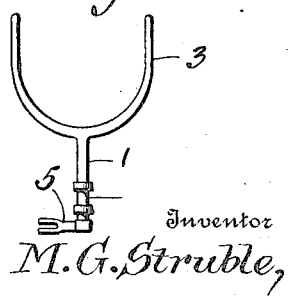
Inventor
M. G. Struble,
By Victor J. Evans
Attorney
Witnesses

UNITED STATES PATENT OFFICE.

MAX G. STRUBLE, OF GIRARD, KANSAS.

HEADLAMP CONTROL.

1,190,684.  Specification of Letters Patent.  Patented July 11, 1916.

Application filed November 17, 1915.  Serial No. 62,006.

*To all whom it may concern:*

Be it known that I, MAX G. STRUBLE, a citizen of the United States, residing at Girard, in the county of Crawford and State of Kansas, have invented new and useful Improvements in Headlamp Controls, of which the following is a specification.

This invention relates to headlamp controls and has for its object to provide simple means whereby the operator of a motor car or other vehicle carrying a headlamp may swing said headlamp to either side to illuminate a bend or curve in the road or to observe objects while the car is either moving or standing still, the lamp operating means embodying a lever in connection with which novel means are provided for causing said arm to return to a neutral or central position after it has been pressed in either direction from said position, provision being also made for latching said lever in its central position with the head lamp throwing its rays in a straight ahead line.

With the above and other objects in view, the invention consists in the novel construction, combination and arrangement of parts, as herein described, illustrated and claimed.

In the accompanying drawings:—Figure 1 is a plan view of a sufficient portion of an automobile to illustrate the application of the present invention thereto. Fig. 2 is a vertical longitudinal section partly broken away, showing the same. Fig. 3 is a section taken on the line 3—3 of Fig. 2 looking upwardly. Fig. 4 is a view of the floor plate showing the form of slot therein and also showing the operating lever in a central position. Fig. 5 is a detail elevation of the lamp bracket and adjacent parts.

Referring to the drawings 1 designates a substantially vertical lamp post which is journaled in one or more bearings 2 in or attached to the frame of the machine. The lamp post is provided with the usual forked upper end portion 3 supporting a head lamp 4 of the conventional type.

In carrying out the invention the lamp post 1 is provided with a lamp turning arm 5 extending laterally therefrom and having pivotally attached thereto the forward extremity of a connecting rod 5' the rear end of which is pivotally attached at 6 to the lower arm of an operating lever 7 the latter being pivotally supported intermediate its ends at 8 between the side portions 9 of a bracket designated generally at 10 and secured to the under side of a floor plate 11 adapted to be fastened to the floor of an automobile or the like. The floor plate 11 is provided with a slot 12 therein having a central offset or notch 13 into which the operating lever is adapted to snap and in which it rests when the head lamp is facing in a straight forward direction.

Secured to the under side of the face plate 11 is a strap or guard 14 the end portions of which are secured at 15 to the plate 11. Journaled within the guard are two grooved pulleys 16 arranged in spaced relation to each other and journaled upon pins 17 the upper ends of which are secured to the floor plate 11 and the lower ends of which are fastened to the guard.

A coiled contractile spring 17 has one end thereof attached to a ring 18 which is seated in an annular groove 19 formed in the operating lever as shown, said ring being adapted to turn in said groove. The spring passes between the guide pulleys referred to and has its other end connected to a hook 19' or its equivalent shown as fastened to the plate 11.

From the foregoing description taken in connection with the accompanying drawings the operation of the device will now be understood. By depressing the operating lever, the lamp is caused to turn in one direction and by pressing said lever upwardly the lamp is turned in the opposite direction. In either movement of the lever referred to such movement is resisted by the action of the spring 17 which is stretched and guided around one pulley or the other. Therefore, when the operating lever is released, the tension of the spring 17 draws the lever back to its central position and in addition thereto said spring 17 forces the lever to enter the notch 13 and thereby latch the lever in its central position, thus centering the headlamp. Therefore, the headlamp is automatically centered or returned to a position in which it directs the rays of light straight ahead.

Having thus described my invention, I claim:—

In headlamp control, a headlamp post mounted to turn on a substantially vertical axis, a lamp turning arm extending laterally therefrom, an operating lever arranged within reach of the operator, a rod connecting said lever with the lamp turning arm, a floor plate having a slot in which said lever operates and also formed with a notch to receive and hold said lever in a central position, guide pulleys arranged in spaced relation to each other, and a spring connected at one end with said operating lever and working between said pulleys and acting to restore said lever to a central position after it has been moved away therefrom and also acting to force said lever into the centering notch.

In testimony whereof I affix my signature in presence of two witnesses.

MAX G. STRUBLE.

Witnesses:
E. E. HANEY,
W. M. BRIZENDINE.

Copies of this patent may be obtained for five cents each, by addressing the "Commissioner of Patents, Washington, D. C."